United States Patent [19]

Wright et al.

[11] 4,254,620

[45] Mar. 10, 1981

[54] JET ENGINE MULTIDUCT NOISE SUPPRESSOR

[75] Inventors: Charles P. Wright; Russel L. Thornock, both of Seattle, Wash.

[73] Assignee: The Boeing Company, Seattle, Wash.

[21] Appl. No.: 881,681

[22] Filed: Feb. 27, 1978

[51] Int. Cl.³ .................. F02K 1/40; F02K 1/48
[52] U.S. Cl. ................... 60/263; 60/271; 181/220; 239/265.11
[58] Field of Search ............. 60/263, 271, 230, 264; 239/127.3, 265.17, 265.27, 265.13, 265.11; 181/220

[56] References Cited

U.S. PATENT DOCUMENTS

| | | | |
|---|---|---|---|
| 2,654,552 | 10/1953 | Jonas | 60/230 |
| 2,935,842 | 5/1960 | Highberg | 239/265.13 |
| 2,944,624 | 7/1960 | Morley | 60/263 |
| 2,990,905 | 7/1961 | Lilley | 181/220 |
| 3,612,212 | 10/1971 | MacDonald | 181/175 |
| 3,647,021 | 3/1972 | Millman et al. | 239/265.13 |
| 3,656,302 | 4/1972 | Townend | 60/271 |
| 4,036,452 | 7/1977 | Schairer | 239/265.13 |
| 4,050,631 | 9/1977 | Syltebo | 60/230 |

*Primary Examiner*—Douglas Hart
*Attorney, Agent, or Firm*—Robert W. Beach; Ward Brown

[57] ABSTRACT

Each duct of a plurality of generally cylindrical exhaust ducts disposed in approximately uniform annular arrangement about an axis is a tube, or a lobe of a radially-branched passage, having a discharge end canted so that the radially outer portion of such duct end projects rearward farther than any other portion of the duct end. The canted duct ends direct the major portion of the exhaust of a jet engine inward toward the axis of the annular exhaust duct arrangement in a plurality of exhaust jets, effecting a rearwardly convergent relationship of the jets.

10 Claims, 7 Drawing Figures

JET ENGINE MULTIDUCT NOISE SUPPRESSOR

BACKGROUND OF THE INVENTION

1. Field of the Invention

The present invention relates to jet engine multiduct noise suppressors and particulary to a modification of such a suppressor for increasing its noise suppression effectiveness.

2. Prior Art

It is known that the noise of a jet engine exhaust can be suppressed to a considerable degree by utilization of a multiduct noise suppressor. The extent to which the noise of the jet exhaust is suppressed depends principally on the number of ducts utilized in such a suppressor. Consequently, a sufficient number of ducts must be used to approach the desired degree of noise reduction. If the suppressor includes too many ducts, however, or if the ducts are too small, the friction of the exhaust gas passing through the ducts will be higher than desirable, resulting in too great a sacrifice of engine power.

Where a multiduct noise suppressor is used for a jet engine, the residual noise is composed of two principal components. The first component is of relatively high pitch and occurs prior to merger of the jets issuing from the several ducts. The other component is of comparatively low pitch and is caused by that portion of the jet exhaust rearward of the location where the jets from the several ducts merge. For subsonic aircraft it has been found that the premerged exhaust jet noise usually is more annoying and objectionable than the postmerged jet noise.

The principal problem in suppressing the noise of a jet engine exhaust is to effect such suppression to a noise level and type that is considered to be tolerable with minimal loss of power and increase of drag and by utilization of a suppressor structure that is reasonably light.

A representative multiduct noise suppressor is disclosed in U.S. Pat. No. 3,612,212 in which the ducts are in the form of tubes. The array of such tubes differs from that of the noise suppressor of the present invention in that the tubes project to different locations rearward as shown in FIG. 1 of that patent. In FIGS. 6, 7 and 8 of U.S. Pat. No. 3,612,212, side nozzles are directed inward, but the major portion of the exhuast is discharged in parallel jets through three discharge tubes arranged in a vertical row.

U.S. Pat. No. 2,990,905 shows a jet exhaust noise suppressor in which an annular row of small convergent nozzles is arranged around a much larger main jet nozzle.

In U.S. Pat. No. 2,935,842 exhaust ducts are in the form of concentric slots instead of being generally cylindrical.

Canadian Pat. No. 618,154 shows a multiduct noise suppressor which reduces postmerged jet engine exhaust noise.

SUMMARY OF THE INVENTION

A principal object of the present invention is to provide a jet engine exhaust noise suppressor of the multiduct type which will have a more effective noise suppression performance than prior multiduct noise suppressors.

In addition, it is an object to provide such a noise suppressor which will be light and of simple construction, and which will depart only slightly in structure from prior multiduct noise suppressors.

It is also an object to increase jet noise suppression with minimum sacrifice of engine power.

More specifically it is an object to increase the effectiveness of a multiduct noise suppressor in reducing the noise produced by the multiple jets prior to being merged even though the noise of the jets after merger may be increased, because the premerged jet noise is of higher frequency and more objectionable than the post-merged jet noise.

The foregoing objects are accomplished by dividing the major portion of the jet engine exhaust into generally equal components distributed annularly, and directing these components inward to merge earlier than would occur if they were parallel. Deviation of each component jet inward can be effected most easily by the discharge nozzle end of each duct being canted so that the radially outer portion of such duct end projects rearward farther than any other portion of the duct end.

DETAILED DESCRIPTION

Figure 5:
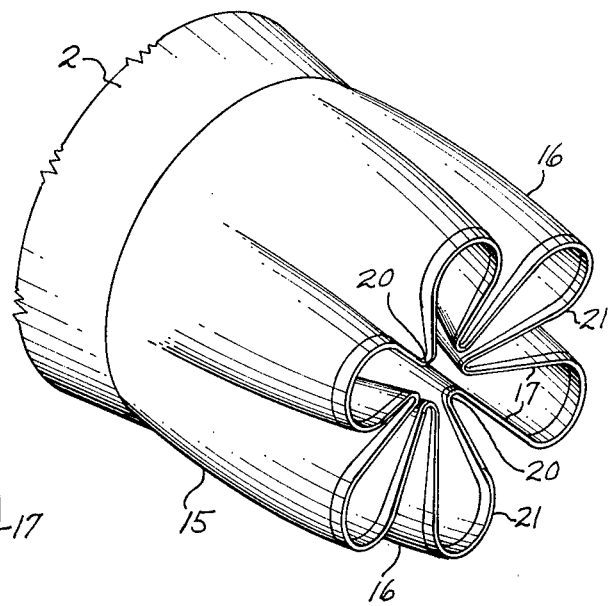
FIG. 5 is a top perspective of an alternate form of multiduct noise suppressor having a radially branched discharge duct.
Figure 6:
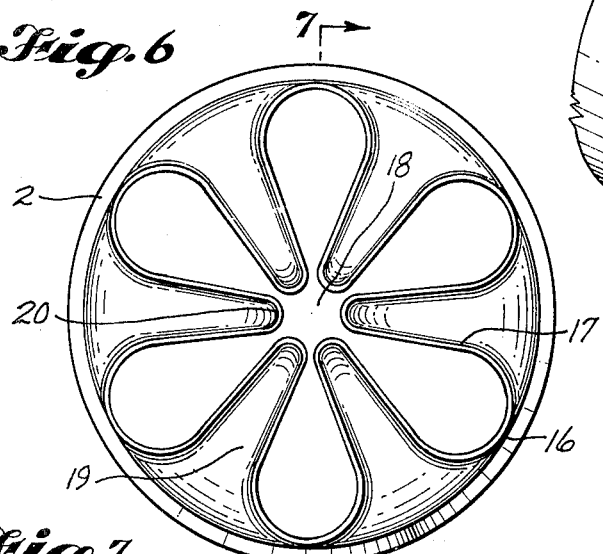
FIG. 6 is a rear elevation of such noise suppressor.
Figure 7:
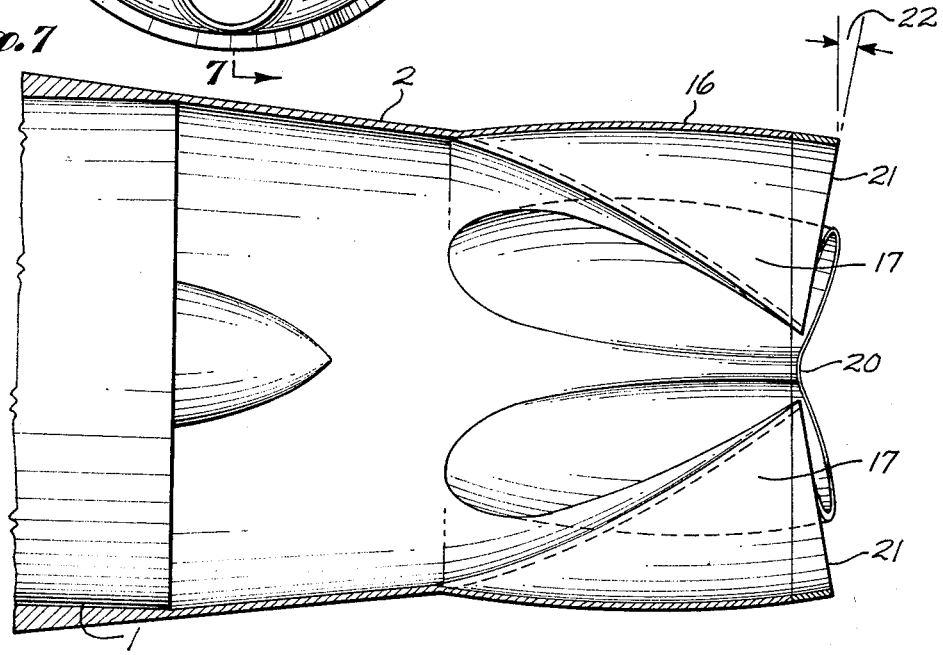
FIG. 7 is a longitudinal section through the noise suppressor shown in FIGS. 5 and 6, taken on line 7—7 of FIG. 6.

The improvement in multiduct noise suppressors according to the present invention can be incorporated easily in certain types of previously known jet engine multiduct noise suppressors. Such previously known noise suppressors divide the jet engine exhaust and discharge it through multiple ducts formed either by tubes or by lobes of a radially branched discharge duct. The multiduct noise suppressor shown in FIGS. 1, 2 and 3 is representative of multitube noise suppressors, and the noise suppressor shown in FIGS. 5, 6 and 7 is representative of radially branched duct noise suppressors.

The type of jet engine multitube noise suppressor to which the present invention is applicable may be attached to the tailpipe outlet of a jet engine 1 by a mounting collar 2. Such mounting collar carries the base 3 from which the array of individual exhaust tubes projects rearward. Such array is shown as including a central tube 4 and annularly arranged tubes 5 encircling the central tube. The major portion of the exhaust from the jet engine is discharged through the annularly arranged tubes, and such tubes are substantially equal in size. Moreover, as seen best in FIG. 3, all of the tubes 4 and 5 project rearward to approximately the same location.

Figure 1:
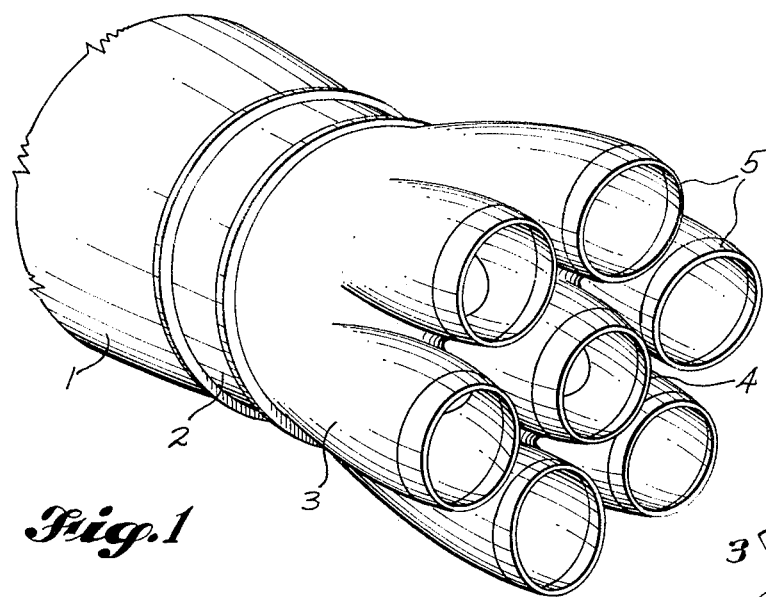
FIG. 1 is a top perspective of a multiduct noise suppressor according to the present invention having multiple tubes.
Figure 2:
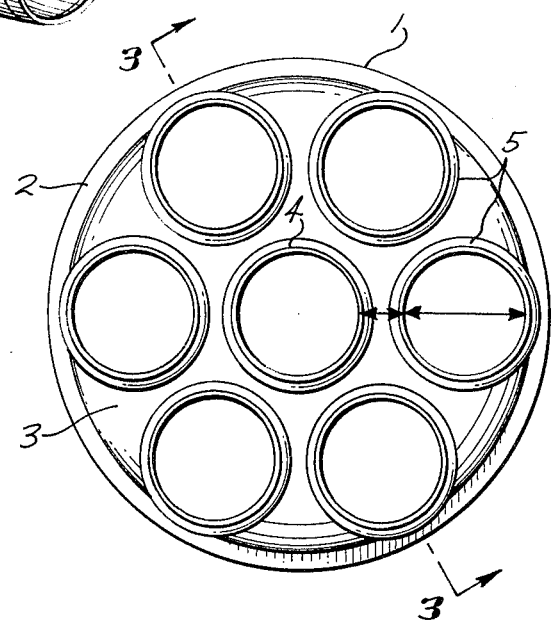
FIG. 2 is a rear elevation of such noise suppressor.
Figure 3:
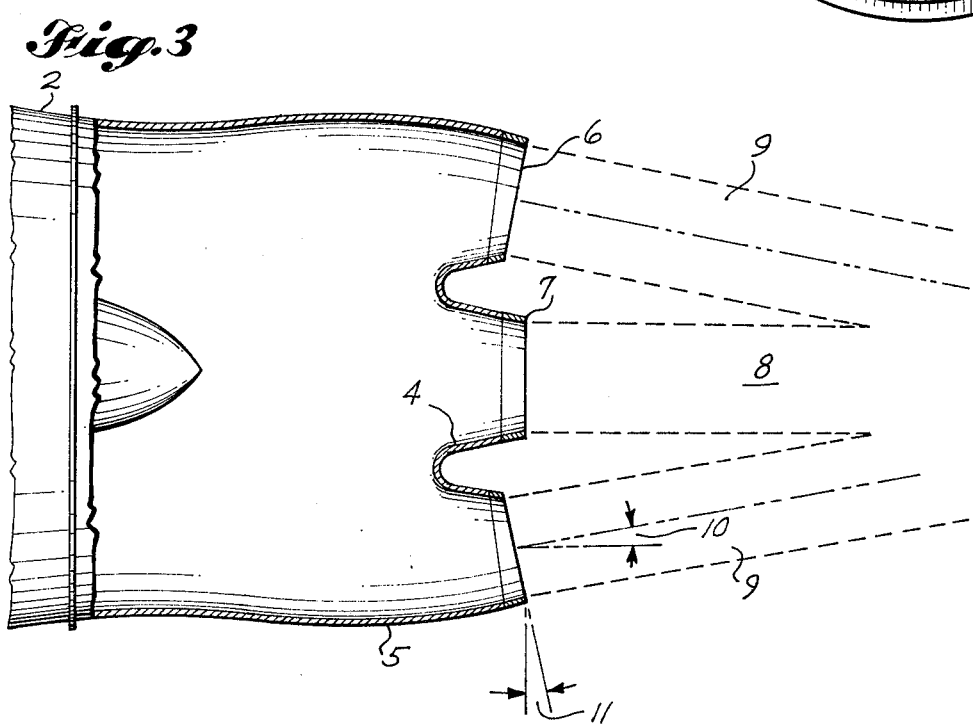
FIG. 3 is a longitudinal section through the noise suppressor of FIGS. 1 and 2 taken along line 3—3 of FIG. 2.

The representative array of tubes shown in the multitube noise suppressor of FIGS. 1, 2 and 3 has a single ring of tubes containing six tubes. The suppressor shown is a compromise between conflicting considerations. Decreasing the number of tubes would provide increased thrust and reduce the drag but the noise reduction would be less. Increasing the number of tubes would provide greater noise suppression but the thrust loss would be increased and more drag would be created.

Other geometric factors besides the number of ducts affect the noise produced by the nozzle. One is the spacing between the individual jets of the suppressor. As the spaces between jets are reduced, the suppressor produces more low frequency noise while the high frequencies, to which the human ear is more sensitive, are reduced. The suppressor shown in FIGS. 1, 2 and 3 requires the tube to be closely packed together.

As a practical matter, manufacturing considerations limit the extent to which the spacing between the tubes 4 and 5 can be decreased. The present invention enables a multiduct noise suppressor to provide improved noise reduction performance comparable to that which could be obtained by decreasing the spacing between the multiple ducts with little sacrifice of engine thrust. The beneficial results of the invention are accomplished by utilizing a construction for directing the exhaust jets discharged from the annularly arranged ducts of the multiduct array in rearwardly convergent relationship. The most desirable construction for obtaining that result is to provide a canted discharge end 6 for each of the annularly arranged tubes 5.

The aft end portion of each tube is tapered or constricted to some extent to form a nozzle. The discharge end 7 of the central tube 4 is perpendicular to the suppressor axis so that the central exhaust jet 8 is projected from such tube in alignment with its axis and with the axis of the multitube array. The axes of the annularly arranged tubes 5 are parallel to the array axis but the discharge ends 6 of such tubes are canted so that the exhaust jet 9 ejected from each annularly arranged tube is directed inward at an angle to the array axis. The angle of deviation of the exhaust jet of each tube 5 will depend upon the degree to which the rear end of such tube is canted. The angle of deviation is approximatey equal to one-half of the cant angle.

The degree of convergence of deviation of the exhaust jets emitted from the annularly arranged tubes 5 will depend upon the size and power of the jet engine, the presence or absence of a central tube 4, the number, arrangement and spacing of the annularly arranged tubes 5, the amount of additional reduction in noise required, and the sacrifice in thrust effect that can be tolerated. The angle of deviation 10 between the direction of the exhaust jet discharged from each tube 5 and the axis of such tube will usually be within the range of 2° to 10°, the preferred angle of deviation usually being about 5°. Consequently, the cant angle 11 of the discharge end 6 of each tube 5, that is, the angle between the plane of the tube end opening and a plane perpendicular to the axis of the array, will be between 4° and 20°. The normally preferred cant angle is approximately 10°.

Figure 4:
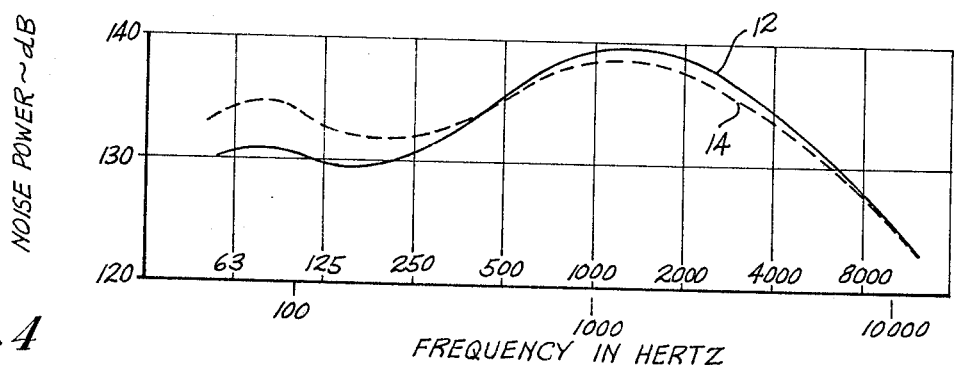
FIG. 4 is a diagram illustrating the noise produced by the exhaust of a jet engine having a multiduct noise suppressor as compared to the same noise suppressor improved in accordance with the present invention.

The graph in FIG. 4 indicates the jet engine noise of a multiduct noise suppressor without and with the tube exits being canted. In FIG. 4 the abscissa of the curves represents frequency, and the ordinate represents noise level or intensity. Curve 12 portrays the noise level or intensity at differenct frequencies for a multielement noise suppressor discharge with its individual jets parallel to one another. Two noise peaks are evident; the peak at the higher frequencies indicates the premerged noise of the individual suppressor jets while the lower peak at the left indicates the postmerged noise at the lower frequencies resulting from the single large jet produced by the coalescense of the individual jets.

Curve 14 portrays the premerged and postmerged exhaust noise from the same engine having the same multitube noise suppressor, except that the discharge ends of the annularly arranged tubes are canted at angles of 10° as illustrated in FIG. 3. It will be noted that the intensity of the postmerged jet noise is increased and the intensity of the premerged jet noise is decreased. Since noise at the higher frequencies of the premerged jet noise is more objectionable than noise at the lower frequencies of the postmerged jet noise, the overall noise represented by curve 14 is less objectionable than the noise represented by the curve 12.

FIGS. 5, 6 and 7 show the present invention applied to a jet engine multiduct noise suppressor of the radially branched discharge duct type. In this instance the noise suppressor 15 extending rearward from the mounting collar 2 has an aft end that is sinuously folded to provide radial branches in the form of lobes 16 joined by pinched spokes 17 to the core portion 18 of the duct. The branches 16,17 are spaced by valleys 19 tapering forward in radial depth from the maximum depth at the aft end of the duct formed by the return bends 20. The throat 17 of each lobe 16 is pinched so that the passage tapers rearward to the discharge end of the suppressor.

The general configuration of the radially branched discharge duct noise suppressor shown in FIGS. 5, 6 and 7 does not constitute part of the present invention. To augment the noise suppression characteristics of such a suppressor with respect to the premerged noise, however, the aft end 21 of each lobe discharge duct is canted at an angle 22 between the plane of the lobe end opening and a plane perpendicular to the axis of the array, comparable to the canting of the trailing ends 6 of the tubes 5 described in connection with FIG. 3.

We claim:

1. A jet engine exhaust noise suppressor having a longitudinal axis and comprising a plurality of exhaust ducts from which the major portion of the jet engine exhaust is discharged, each of said ducts having an outer portion remote from the suppressor axis which outer portion projects rearward farther than any other portion of that duct, the passage through each of said ducts being nondivergent rearward relative to the suppressor axis from a location forward of the farthest forward point of the discharge end of that duct, and the discharge end of each of said ducts being canted inward relative to a plane perpendicular to the passage through that duct at the farthest forward point of said discharge end of that duct, said canted discharge ends of said ducts contributing to discharging the exhaust jets from said ducts in rearwardly convergent relationship.

2. A jet engine exhaust noise suppressor having a longitudinal axis and comprising a plurality of exhaust ducts from which the major portion of the jet engine exhaust is discharged, each of said ducts having an outer portion remote from the suppressor axis which outer portion projects rearward farther than any other portion of that duct, the passage through each of said ducts having a wall remote from the suppressor axis which wall is nondivergent rearward relative to the suppressor axis at a location immediately forward of the farthest forward point of the discharge end of that duct, the discharge end of each of said ducts being canted inward relative to a plane perpendicular to the passage through that duct at the farthest forward point of said discharge end of that duct, said canted discharge ends of said ducts contributing to discharging the exhaust jets from said ducts in rearwardly convergent relationship.

3. A jet engine exhaust noise suppressor having a longitudinal axis and comprising several exhaust ducts disposed in approximately uniform annular arrangement about the suppressor axis from which ducts the major portion of the jet engine exhaust is discharged, each of said ducts having an outer portion remote from the suppressor axis which outer portion projects rearward farther than any other portion of that duct, said outer portions of said ducts projecting rearward to approximately the same location, the pasage through each of said ducts being nondivergent rearward relative to the suppressor axis from a location forward of the farthest forward point of the discharge end of that duct, and the discharge end of each of said ducts being canted inward at an angle within the range of 4° to 20° relative to a plane perpendicular to the passage through that duct at the farthest forward point of said discharge end of that duct, said canted discharge ends of said ducts contributing to discharging the exhaust jets from said ducts in rearwardly convergent relationship.

4. The suppressor defined in claim 1 or 2, in which the exhaust ducts include several ducts arranged in at least one ring.

5. The suppressor defined in claim 1 or 2, in which the discharge end of each duct is canted at an angle within the range of 4° to 20° relative to a plane perpendicular to the passage through that duct at the farthest forward point of the discharge end of that duct.

6. The suppressor defined in claim 1 or 2, in which the discharge end of each duct is canted at an angle of approximately 10° relative to a plane perpendicular to the passge through that duct at the farthest forward point of the discharge end of that duct.

7. The suppressor defined in claim 1 or 2, in which the exhaust ducts are tubes.

8. The suppressor defined in claim 1 or 2, in which the exhaust ducts are lobes of a radially branched passage, each lobe being pinched radially inwardly.

9. The suppressor defined in claim 4, in which the exhaust ducts are disposed in approximately uniform annular arrangement about the suppressor axis.

10. The suppressor defined in claim 1 or 2, in which the discharge ends of all the ducts project rearward to approximately the same location.

* * * * *